INVENTOR.
Laurence B. Kimbrough
BY
ATTORNEY

INVENTOR.
Laurence B. Kimbrough
BY
ATTORNEY

INVENTOR.
Laurence B. Kimbrough
ATTORNEY

INVENTOR.
Laurence B. Kimbrough
BY
ATTORNEY

United States Patent Office 3,701,674
Patented Oct. 31, 1972

3,701,674
APPARATUS AND METHOD FOR APPLYING A BEAD OF SEALING MATERIAL TO A SEALING SURFACE OF A CATHODE-RAY TUBE
Laurence B. Kimbrough, Lititz, Pa., assignor to
RCA Corporation
Filed Aug. 12, 1970, Ser. No. 63,134
Int. Cl. B05c 7/00; B44d 5/00; C03c 17/00
U.S. Cl. 117—43                                                3 Claims

ABSTRACT OF THE DISCLOSURE

An apparatus including a rotatable support for holding a cathode-ray tube component, for example, a funnel comprising a sealing surface having a closed configuration including radiused corners, an inner border, and an outer border, a means for rotating the support, a sealing-material container having a bottom outlet, a means for tracking the sealing surface with the container along a first path on the sides of the sealing surface, and a means for tracking the sealing surface with the container along a second path displaced towards the outer border on the corners of the sealing surface. Method includes positioning sealing surface of the cathode-ray tube; for example, a funnel-sealing surface in a horizontal plane, movably positioning a container having a bottom outlet over the sealing surface, rotating the sealing surface about the center of the closed configuration, tracking said rotating sealing surface with the outlet along the first path, approaching the beginning of the corners of the sealing surface gradually moving the outlet from the first path to the second path, tracking the rotating sealing surface with the outlet on each of the corners at the second path, approaching the ending of each of the sealing surface corners gradually moving said outlet from the second path to the first path, and during rotation dispensing a bead of sealing material at a uniform rate on the sealing surface.

BACKGROUND OF THE INVENTION

The invention relates to an improved method and apparatus for applying a bead of sealing material to a sealing surface of a cathode-ray tube, and particularly, but not exclusively, to an improved frit applicator for applying frit to a sealing surface of a color-television-picture-tube.

In manufacturing some cathode-ray tubes, a bead of frit is applied to the sealing surface of a funnel, a faceplate panel is placed on top of the bead, and the assembly is heated to melt the frit and seal the faceplate panel to the funnel. One prior apparatus for applying a bead of sealing material to a funnel-sealing surface includes a rotatable funnel support, a means for rotating the support, a speed-control means associated with said support, a sealing-material container having a bottom outlet, a container-guide assembly including a freely rotating element surrounding the outlet with a roller attached to the rotating element, and a means for movably supporting the container and for urging the roller against the inner sealing-surface border. The means for movably supporting the container permits the container to move in the direction of the axis of funnel rotation.

When the prior apparatus is used for applying a bead of frit to a rectangular or ultrarectangular funnel, the bead of frit does not deposit on the sealing surface directly under the outlet, but drifts due to lag, depositing slightly behind the outlet relative to the direction of rotation of the sealing surface. The change in direction of the sealing-surface corners rotating past the outlet causes the bead to deposit nearer the inner border at the sealing-surface corners. This may result in improper sealing of the funnel and the panel.

In addition, when the radius of rotation of the rotating element is larger than about 1 inch, excessive force is necessary to properly urge the roller against the sealing-surface border so as to maintain the outlet a uniform distance from the sealing-surface border. Excessive force may result in movement of the funnel in the support, chipping of the funnel glass at the sealing-surface border in contact with the guide roller, and an undesirable load on the container-guide roller leading to guide-roller failure.

When the guide-roller diameter is too small, or when the guide roller is not sufficiently freely rotatable, the guide roller skids on the sealing-surface border. Guide-roller skidding may cause improper operation of the guide assembly and improper positioning of the container outlet, resulting in improper deposition of the bead and improper sealing of the funnel and panel.

In some forms of prior apparatus, a pneumatic cylinder is used to maintain the guide roller engaged with a sealing-surface border with a uniform distance between a sealing-surface border and the container outlet. The slow response and internal friction in the cylinder may cause improper operation of the guide assembly, resulting in the container outlet not maintained a uniform distance from the sealing-surface border. This results in a deposit of the bead on the sealing surface at a nonuniform distance from a sealing-surface border and may subsequently result in improper sealing of the funnel and panel.

SUMMARY OF THE INVENTION

The novel apparatus, as in prior apparatus, includes a rotatable support for holding a component of a cathode-ray tube; for example, a funnel, a means for rotating the support, a sealing-material container having a bottom outlet, a speed-control means associated with said support, a means for movably supporting the container in a substantially horizontal plane to position the outlet over a rectangularly-shaped-sealing surface comprising a closed configuration including radiused corners and an inner border, and a means for guiding the container along a first path over the rotating sealing surface.

The novel apparatus, unlike the prior apparatus, includes a means for guiding the container along a second path displaced towards the outer border on the corners of the sealing surface. Guiding the container on a second path at the corners of the sealing surface prevents the frit bead from depositing nearer the inner border, resulting in a substantially uniform deposition of the frit bead with respect to a sealing surface corner inner border. This subsequently provides for satisfactory sealing of the funnel and panel.

The novel apparatus also includes a tracking means for gradually moving the container outlet between the first path and the second path. This tracking means provides a gradual transition between the paths, thereby approximately compensating for drift of the frit bead. When changing paths, this results in a substantially uniform deposition of the frit bead with respect to the inner border of the sealing surface.

In one form of the novel apparatus, the means for guiding the container comprises a guide assembly having a rotating element and a guide roller attached to the rotating element. Unlike the prior apparatus, the radius of the rotating element is in the range of ¼ inch to 1 inch. Selecting a rotating element radius in this range eliminates the excessive force necessary to urge the guide roller against the sealing surface border and to maintain the container outlet on the proper paths, thereby preventing movement of the sealing surface in the support, chipping of the glass, and excessive loading of the guide roller.

The novel apparatus also includes a guide roller having a diameter within the range of ¼ inch to ½ inch. This diameter guide roller provides proper rolling on the sealing-surface border without skidding, thereby maintaining the container outlet on the proper path.

In another form, the novel apparatus includes a counterweight to properly maintain the guide roller urged against an inner border. The counterweight eliminates the uneven forces on the guide roller, thereby continuously permitting the guide assembly to maintain the container outlet on the proper path.

A novel method includes positioning a component of a cathored-ray tube comprising a sealing surface having a closed configuration including radiused corners, an inner border, and an outer border for example the sealing surface of a funnel in a substantially horizontal plane, then movably positioning above the horizontal plane a container having a bottom outlet over the sealing surface. The sealing surface is rotated in a substantially horizontal plane about the center of the closed configuration during which it is tracked by the container outlet along a first path which is a first uniform distance from the inner or outer sealing-surface border. Approaching each of the corners of the sealing surface, the outlet is gradually moved from the first path to a second path, which is a second uniform larger distance from the inner or outer sealing-surface border. The sealing surface is then tracked in each of the corners on the second path. Then, approaching the ending of each of the corners, the outlet is gradually moved from the second path to the first path. During the rotation of the sealing surface, a bead of sealing material is dispensed from the outlet on the sealing surface at a substantially uniform rate.

The novel process, unlike a prior process, corrects for drift of the bead of sealing material towards the inner border at the corners providing for a uniform deposition of the frit bead relative to the inner border on the entire sealing surface. This subsequently results in a satisfactory funnel and panel seal.

In another form of the novel process, the bead of sealing material is dispersed at a greater uniform rate at the corners providing an increased sealing-material coverage of the sealing surface and subsequently providing an improved funnel and panel seal.

DESCRIPTION OF THE PREFERRED EMBODIMENT

Figure 1:
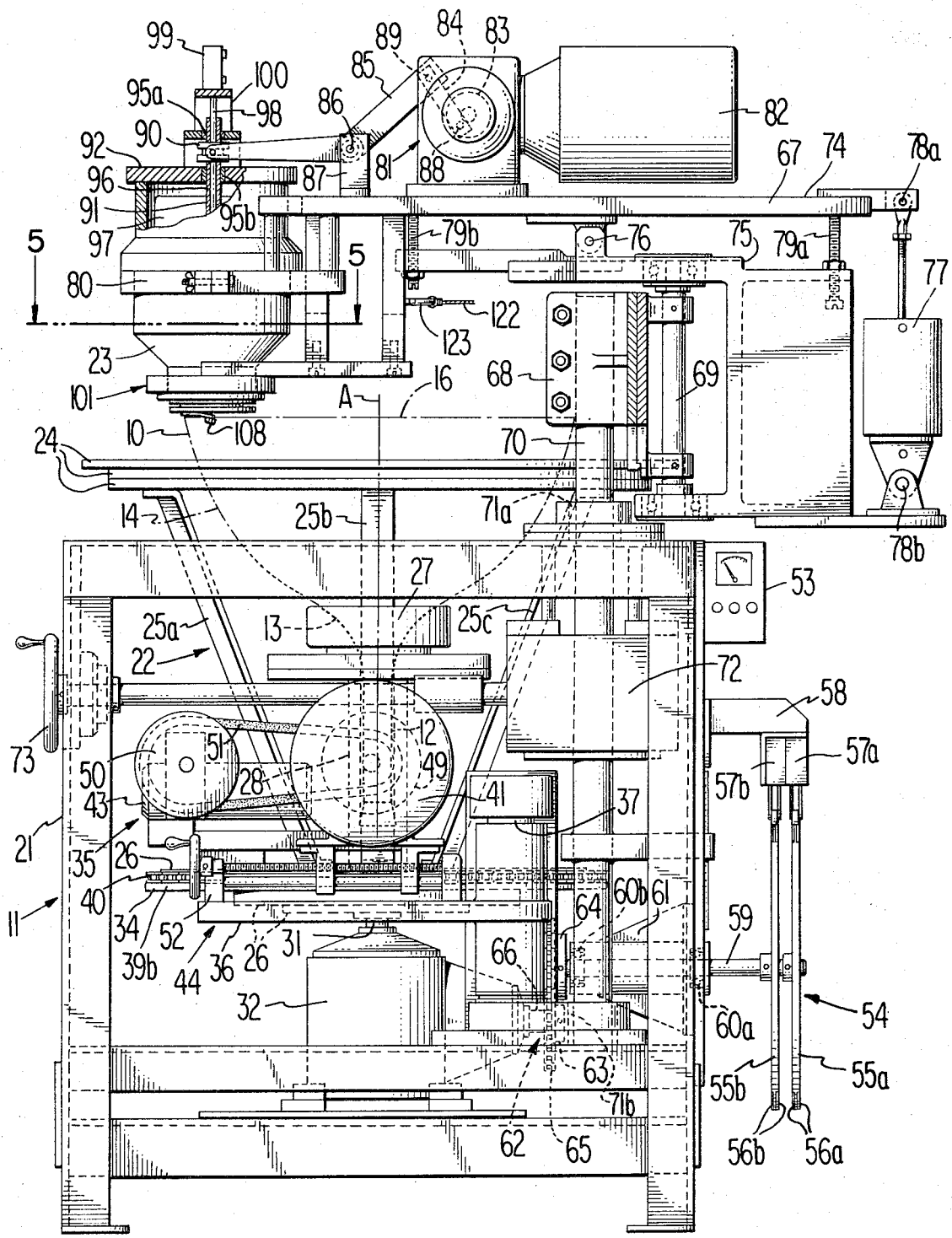
FIG. 1 is a side elevational view of an embodiment of the novel apparatus for applying a bead of sealing material to the sealing surface of a color-television-picture-tube funnel.
Figure 2:
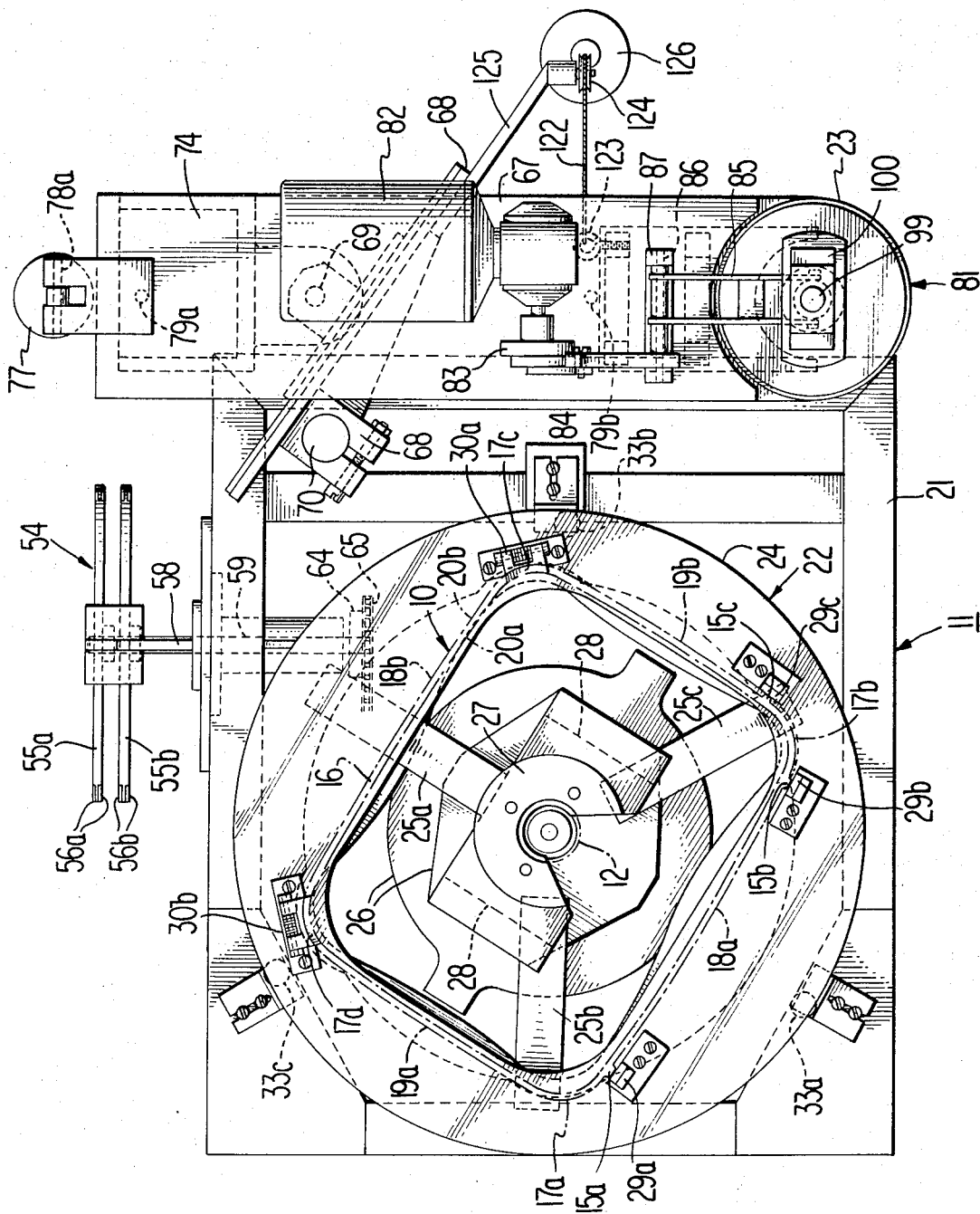
FIG. 2 is a plan view of the novel apparatus of FIG. 1.

FIGS. 1 and 2 illustrate a color-television-picture-tube funnel 10 positioned on a novel apparatus known generally in the art as a "frit applicator" 11. The funnel 10 comprises a neck 12, a yoke portion 13, a funnel portion 14, three pads 15a, 15b, and 15c, and a sealing surface 16, which is substantially normal to the axis A—A of the funnel 10. The sealing surface 16 is substantially rectangular in shape having four corners portions 17a through 17d, two long sides 18a and 18b, two short sides 19a and 19b, an inner border 20a and an outer border 20b. The frit applicator 11 is designed to deposit a continuous bead of sealing material or frit on the sealing surface 16.

The novel apparatus in FIGS. 1 and 2 is comprised of a frame 21, a rotatable funnel-support assembly 22 positioned in the frame 21, and a sealing-material container 23 movably positioned above the frame 21. The funnel-support assembly 22 comprises a circular platform unit 24 attached with three platform supports 25a, 25b, and 25c to a bottom plate unit 26. Three pad-reference units 29a, 29b and 29c and two funnel-corner-clamp assemblies 30a and b are attached to the platform unit 24. The bottom plate unit 26 mounts on an input shaft 31 of a first gearbox 32 which is attached to the frame 21. The circular platform unit 24 is rotatably supported in a horizontal plane by three guide rollers 33a, 33b and 33c attached to the frame 21.

Figure 3:
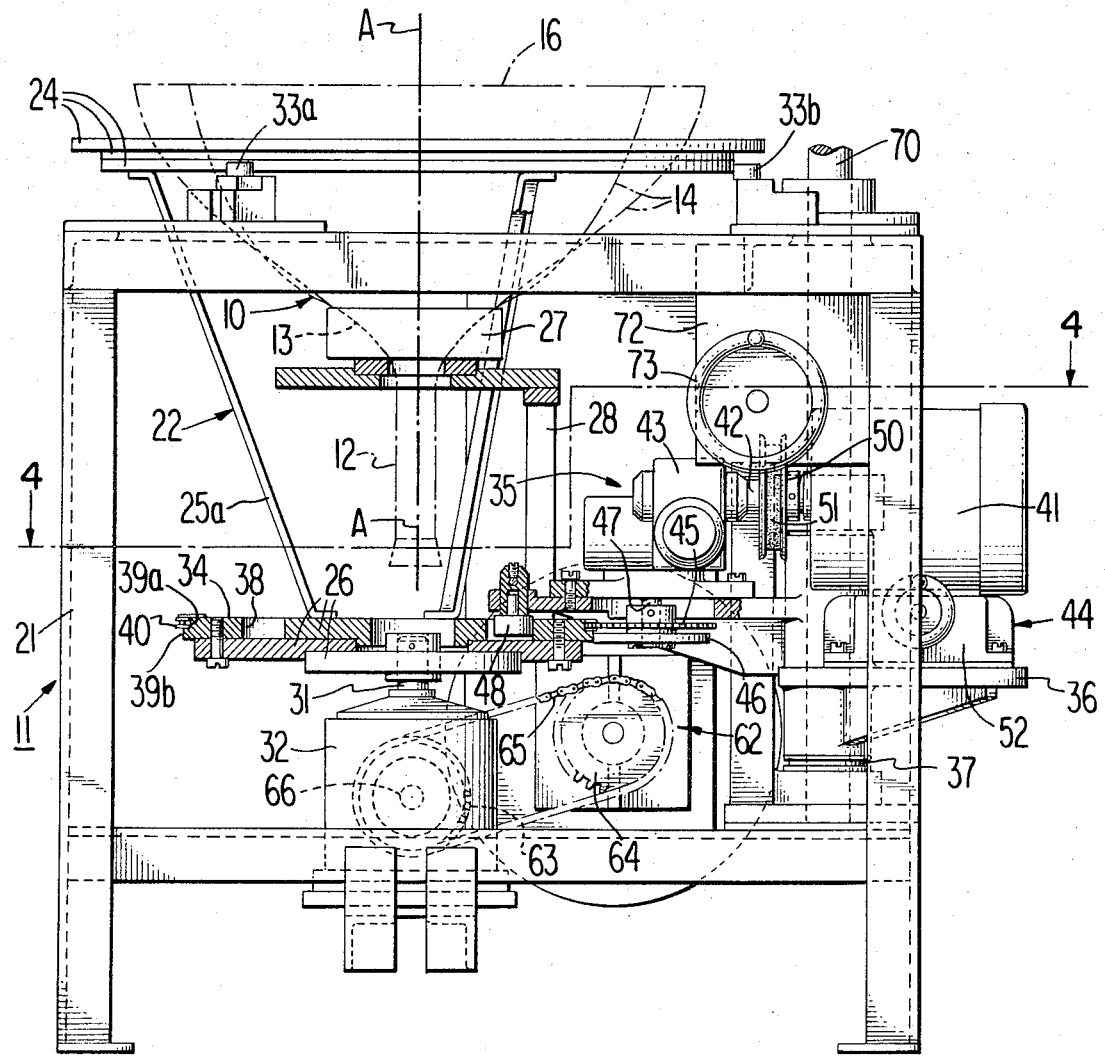
FIG. 3 is a partial front elevational view of the novel apparatus of FIG. 1.
Figure 4:
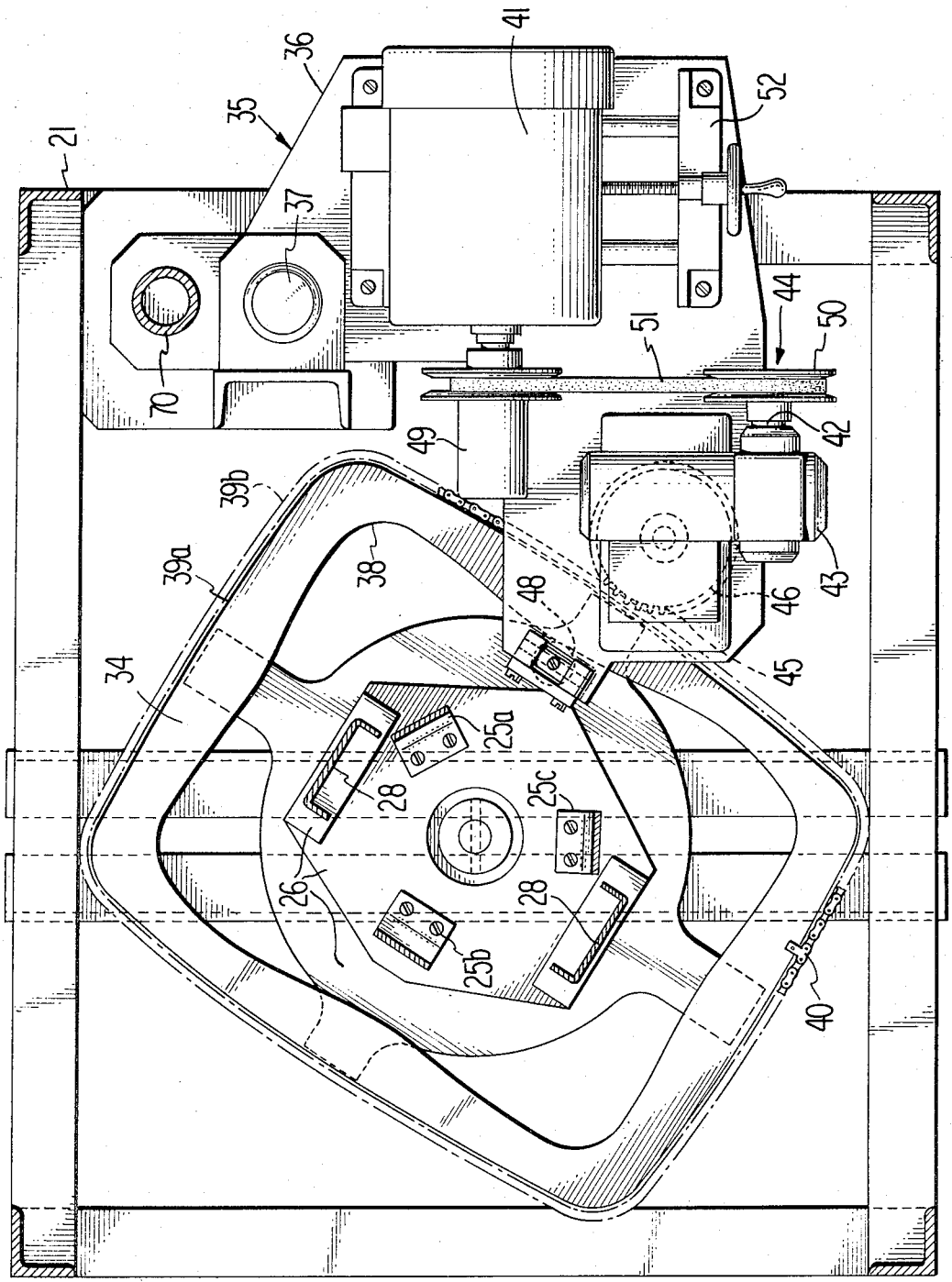
FIG. 4 is a sectional view of the apparatus of FIG. 3 on the section line 4—4.

FIGS. 3 and 4 show in greater detail a means for rotating the funnel-support assembly 22 comprised of a rectangularly shaped driven gear 34 attached to the bottom plate unit 26. The drive unit 35 is supported on drive-unit arm 36 pivotally mounted to the frame 21 at the drive arm pivot 37. The rectangularly shaped driven gear 34 includes an inside surface 38 and two outside surfaces 39a and 39b. A continuous roller chain 40 is connected around the periphery of one outside surface 39a. The pitch line of the roller chain 40 and subsequently the form of the rectangularly shaped driven gear 34 is substantially the shape of the center of the funnel sealing-surface 16 for a rectangular funnel (shown in FIG. 2). The pitch line of the roller chain 40 need not be the shape of the center of the funnel-sealing surface, but may be formed in a smaller or larger proportion thereof. For example, a roller chain 40 with a center pitch line substantially the shape of the center of a 19-inch rectangular funnel may be used for applying sealing material to a 25-inch rectangular funnel where the shape of the 19-inch funnel-sealing surface is substantially a proportion of the shape of the 25-inch funnel-sealing surface.

The drive unit 35 comprises a variable speed motor 41 driving the horizontal input shaft 42 of a second gearbox 43 by an adjustable drive assembly 44. A drive sprocket 45 and a guide wheel 46 are attached to a vertical output shaft 47 of the second gearbox 43. The drive-unit arm 36 is pivotally attached to the frame to permit the guide wheel 46 to continuously engage the outside surface 39b. The diameters of the guide wheel 46 and drive sprockets 45 are selected to maintain the drive sprocket 45 and the roller chain 40 in proper mesh during rotation of the rectangularly shaped driven gear 34. A cam follower 48 attached to the drive-unit arm 36 contacts the inside surface 38 to maintain the guide wheel 46 in contact with the outer cam surface 39 during rotation of the driven gear 34. The adjustable drive assembly 44 includes an adjustable sheave 49, a fixed sheave 50, a belt 51, and an adjustable motor mount 52.

The speed-control means includes the rectangularly shaped driven gear 34 and drive unit 35, a motor-speed control 53, and an actuator assembly 54. The rotation of the driven gear 34 by the drive unit 35 provides an approximate uniform relative speed between the sealing surface 16 and the sealing-material container 23.

Referring again to FIGS. 1 and 2, the actuator assembly 54 comprises two actuator disks 55a and 55b, adjustable actuators 56a and 56b positioned on the actuator disks 55a and 55b as related to the corner portions 17a through 17d of the funnel-sealing surface, 16, and two switches 57a and 57b. The switches 57a and 57b are attached to a switch bracket 58 mounted on the frame 21. The actuator disks 55a and 55b are mounted on a shaft 59 rotatably supported on the frame 21 on bearings 60a and 60b in a bearing support 61 attached to the frame 21. A chain-drive unit 62 comprised of an actuator-disc-drive sprocket 63, an actuator-disc-driven sprocket 64, and a chain 65 connect the shaft 59 to the horizontal output shaft 66 of the first gearbox 32. The first gearbox 32 has a 2:1 output ratio, and the chain drive unit 62 has a 1:2 output ratio to rotate the actuator disks 55a and 55b in a direct relationship to the rotation of the funnel-support assembly 22.

In FIGS. 1 and 2, the means for movably supporting the container comprises a container support arm 67 pivotally attached to an arm-support bracket 68 at the arm-pivot shaft 69. The support bracket 68 is attached to a vertical support post 70. The vertical support post 70 is mounted vertically adjustable in the frame 21 in support post bearings 71a and 71b. A height adjustment unit 72 including height adjust knob 73 is mounted between the frame 21 and the vertical support post 70.

The container support arm 67 comprises an upper platform 74 pivotally mounted to a lower platform 75 at a horizontal platform pivot 76. A first pneumatic cylinder 77 is connected between the upper platform 74 and the lower platform 75 at first cylinder pivots 78a and 78b. Two adjustable stops, 79a and 79b, are attached to the lower platform 75 to limit the pivotal movement of the upper platform 74. The sealing-material container 25 is attached at the end of the container support arm 67 with a container clamp unit 80, and oriented substantially vertically over the contact point of the drive sprocket 45 and the rectangularly shaped driven gear 34.

An agitator assembly 81 comprises a gear motor 82, a drive eccentric 83 on the output shaft of the gear motor 82, link 84, and a crank arm 85 mounted at a crank-arm pivot 86 to a crank-arm support bracket 87. The support bracket 87 is mounted on the upper platform 74. The link 84 connects one end of the crank arm 85 and the drive eccentric 83 at the link pivots 88 and 89. The other end of the crank arm 85 is forked to operate in a grooved lift block 90 attached to agitator 91 to vertically reciprocate agitator 91 in the sealing-material container 23.

Figure 6:
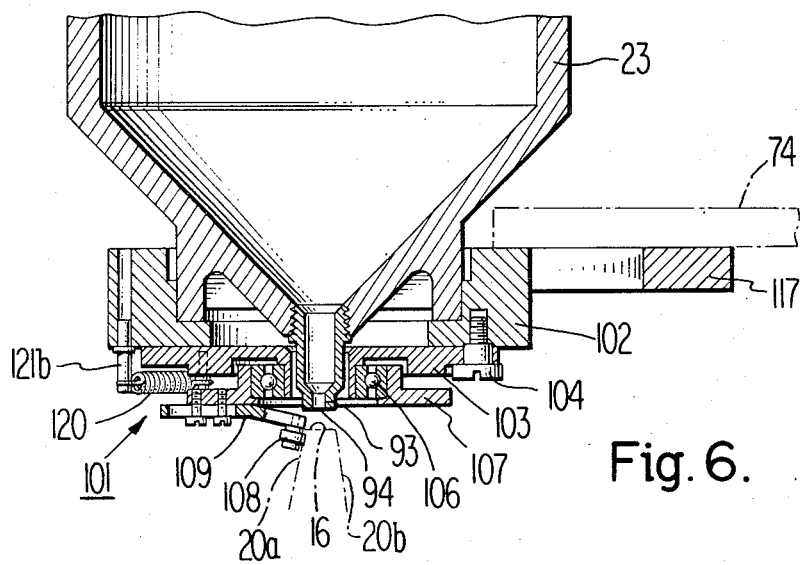
FIG. 6 is a partial elevational sectional view on section line 6—6 of the guide assembly of FIG. 5.
Figure 7:
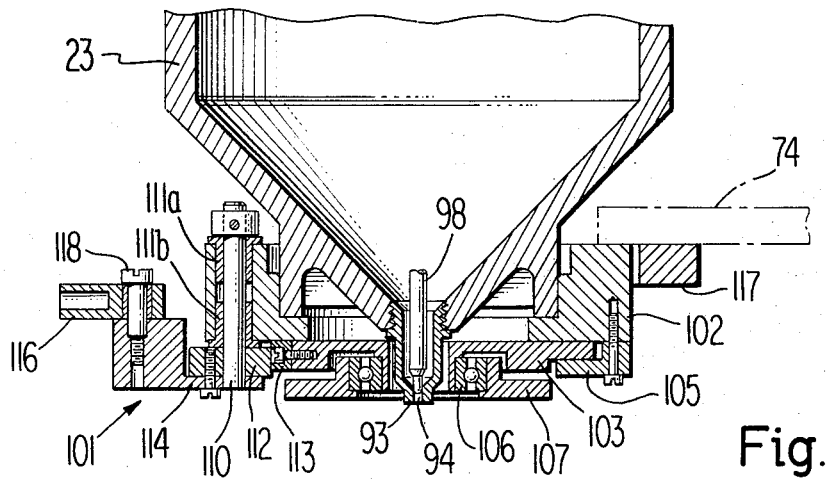
FIG. 7 is a partial elevational sectional view on section line 7—7 of the guide assembly of FIG. 5.

The sealing-material container 23 includes a removable cover assembly 92 and a nozzle 93 (FIGS. 6 and 7) having a bottom outlet 94 (FIGS. 6 and 7). The agitator 91 is positioned in the container 23 through agitator bearings 95a and 95b for sliding movement therein. The agitator 91 comprises a hollow agitator shaft 96 with blades 97. A sealing-material shut-off needle 98 extends through the hollow agitator shaft 96 to close the bottom outlet 94. A second pneumatic cylinder 99 is mounted on a second pneumatic cylinder-mounting bracket 100 on the removable cover assembly 92 and connected to the top end of the shut-off needle 98.

Figure 5:
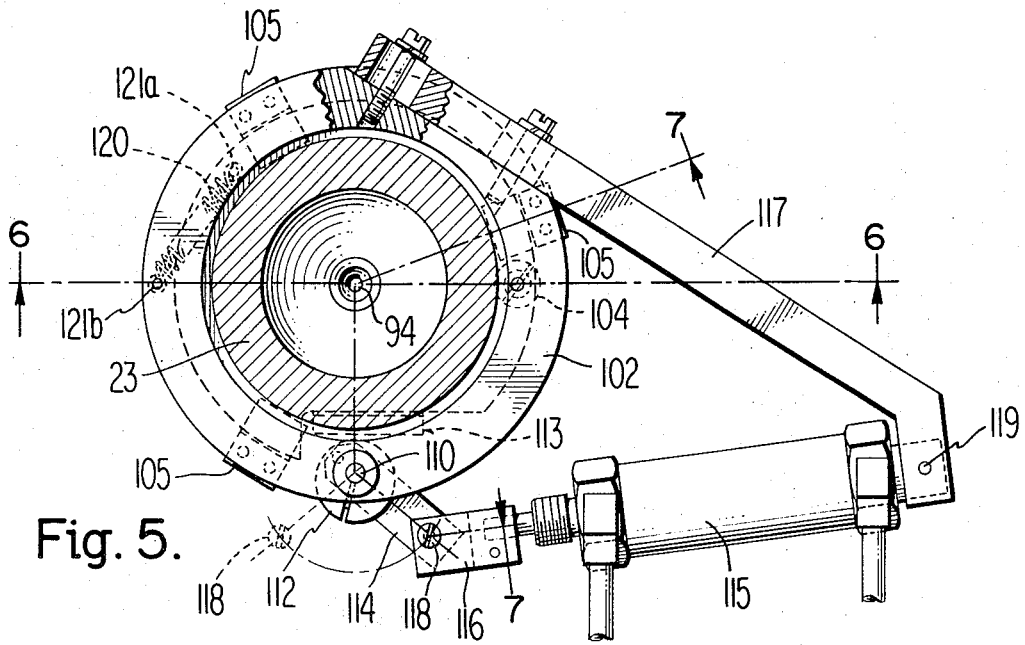
FIG. 5 is a partial sectional plan view on section line 5—5 of the guide assembly of the novel apparatus of FIG. 1.

FIGS. 5, 6 and 7 show in greater detail the means for tracking the rotating sealing surface 16 on a first path comprising a funnel guide assembly 101. The funnel guide assembly 101 includes a guide-assembly support 102 attached to the container 23. A bearing mounting member 103 is attached to the support 102 by a pivot screw 104, and retained against the bottom of the support 102 by retaining plates 105. A nozzle bearing 106 mounts over the bearing mounting member 103 concentric with the bottom outlet 94 of the nozzle 93, and a rotating member 107 attaches over the nozzle bearing 106. A funnel-guide roller 108 is attached to an adjustable guide-roller bracket 109 mounted on the rotating member 107.

A means for tracking the rotating sealing surface on a second path displaced towards the outer border 20b includes a cam shaft 110 pivotally mounted in cam shaft bearings 111a and 111b in guide-assembly support 102. A cam 112 is attached to the cam shaft 110 to engage a wear plate 113 attached to the bearing mounting member 103. A cam operating lever 114 is attached to the cam 112. A third pneumatic cylinder 115 is attached at one end to the lever 114 at the clevis 116 and at the other end to a third cylinder-support bracket 117 at the third cylinder pivots 118 and 119. The third cylinder-support bracket 117 is attached to the support 102. A spring 120 attaches to a spring mounting 121a in the support 102 and a spring mounting 121b in the bearing mounting member 103 to maintain the wear plate 113 of the bearing mounting member 103 in contact with the cam 112. A solenoid (not shown) operated by switch 57a operates the third air cylinder 115 to rotate the cam 112, thereby moving the nozzle bearing 106 off center from the nozzle 93.

A cable 122 is attached to the lower platform 75 at a cable pivot 123 as shown in FIG. 2. A pulley 124 is attached to a pulley-support arm 125. The pulley-support arm 125 is attached to the arm support bracket 68. The cable 122 passes from the pulley-support arm 125 over the pulley 124 and connects to a counterweight 126.

In the operation of the apparatus shown in FIGS. 1 and 2, a rectangular or ultrarectangular funnel 10 is positioned in a substantially horzontal plane on the support assembly 22 with the yoke portion 13 contacting the yoke support 27, the pads 15a, 15b, and 15c contacting the pad reference units 29a, 29b, and 29c respectively, and two funnel corners supported by the corner-clamp assemblies 30a and 30b.

As used in this specification, an ultrarectangular color-television-picture tube has straighter sides and more "squared corners" than a rectangular color-television-picture tube. For example, in RCA ultrarectangular color-television-picture tube No. 25VABP22, the radius of the long sides is 98.395 inches, the radius of the short sides is 76.810 inches an the corner radium is 1.467 inches, while the RCA rectangular color-television-picture tube No. 25BCP22, the radius of the long side is 62.700 inches, the radius of the short side is 53.600 inches, and the corner radius is 2.158 inches.

The container 23 is movably positioned on the container-support arm 67. The container-support arm is rotated on the arm-pivot shaft 69 until the container 23 is inside the funnel-sealing surface 16 and a first switch (not shown) is actuated to operate the first pneumatic cylinder 77 to pivot the upper platform 74 about the platform pivot 76 to move the container 23 and the funnel-guide assembly 101 from a standby position into an operating position. In the operating position, the container-support arm 67 is moved until the funnel-guide roller 108 is against the inside border 20a of the funnel portion 14 and the outlet 94 is over the funnel-sealing surface 16. The sealing surface is then rotated substantially in a horizontal plane about the axis of the funnel by actuating a second switch (not shown). Actuating the second switch operates the variable speed motor 41 to rotate the funnel 10 at a first uniform motor speed.

During the rotation, a bead of sealing material (frit) is dispensed on the sealing surface 16 at a substantially uniform rate. To dispense the frit, a third switch (not shown) is operated to retract the second pneumatic cylinder 99. Operating the second pneumatic cylinder raises the needle 98, and a bead of frit flows from the outlet 94 onto the rotating sealing surface 16. Operation of the third switch simultaneously resets a time (not shown) which automatically closes off the flow of sealing material after approximately one rotation of the funnel. The second switch is then actuated to retract the first pneumatic cylinder 77 to permit pivoting the upper platform 74 to the standby position. Raising the upper platform 74 permits the container-support arm 67 to be pivoted to the standby position shown in FIG. 2. The funnel 10 is removed from the funnel-support assembly 22, and the process is repeated for a second funnel. During the operation of the frit applicator 11, the sealing-material container 23 is filled with sealing material and the agitator assembly is continuously operated.

During the deposit of frit on the sealing surface in the preferred apparatus, the rotating sealing surface 16 is tracked with the outlet 94 along a first path a first uniform distance from the inside border 20a. To maintain the nozzle on the first path, the funnel-guide roller 108 is urged against the inside border 20a of the funnel-sealing surface 16. The guide roller 108 is maintained engaged with the border 20a by the force from a counterweight 126.

Figure 9:
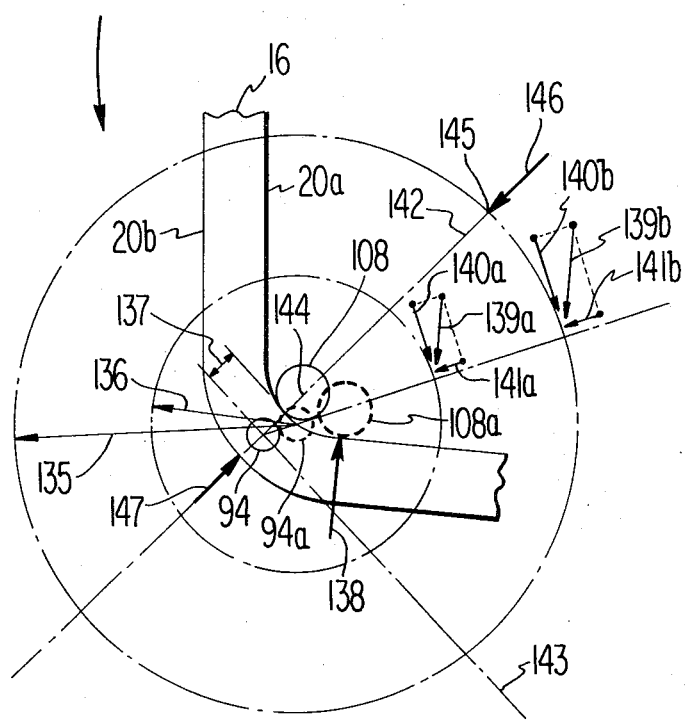
FIG. 9 is a schematic diagram to aid in analyzing the forces acting on the rotating element in a stable and unstable position.
Figure 8:
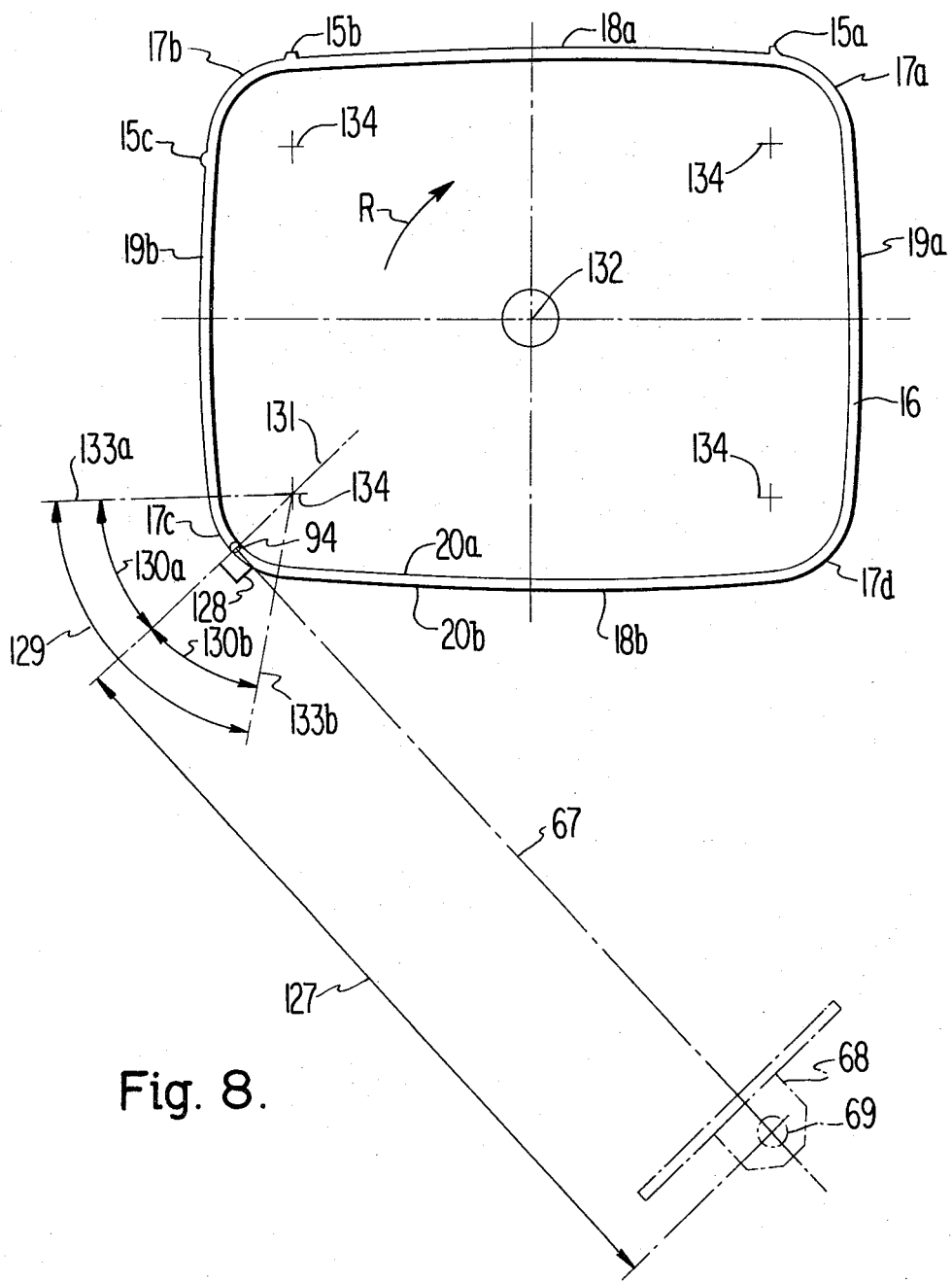
FIG. 8 is a diagram to aid in analyzing the preferred relationship of the container arm and a corner center radial line of the sealing surface.

In the preferred apparatus as shown in FIG. 8, the container-support arm 67 is positioned normal to the corner center radial line 131. This provides for equiangular rotation of the funnel-guide assembly 101 as related to the direction of the container-support arm 67 during depositing of the bead of sealing material at the funnel-corner portions 17a through 17d. Referring to FIG. 9, the center radial line 131 bisects the corner arc portion between the radial line 133a and the radial line 133b to provide for equal angles 130a and 130b. The radial lines 133a and 133b are defined as the lines from the center 134 of the corners 17a through 17d through the points of tangency of the sides 18a, 18b, 19a, and 19b and the corners 17a through 17d of the sealing surface 16. The total angular movement of the rotating member is shown by the angle 129 in FIG. 9. The arm-support bracket 68 is adjustable so that the container-support arm 67 can be positioned normal to the center radial line 131 for each different size funnel.

Referring to FIG. 9, in the operation of the funnel-guide assembly 101, the guide roller 108 normally rotates concentrically about the nozzle outlet 94 to maintain the center of the nozzle outlet 94 and the center of the guide roller on a line 142 normal to the curvature of the contact surface (inside border 20a). This results in a first uniform distance 137 between the outlet 94 and the inside border 20a.

To better describe the operation of the funnel-guide assembly 101, the guide roller 108a (dashed circle) and outlet 94a (dashed circle) are shown in an unstable position in FIG. 9. Upon contact of the inside border 20a of the funnel portion 14 with the unstable guide roller 108a, a force in the direction of the arrow 138 acts on the guide roller 108a. This force causes a restoring force, shown by the directional arrow 139a (on a 1-inch radius) or 139b (on a 2-inch radius), to act on the nozzle bearing 106. Tangential components of the restoring force are shown by the directional arrows 140a or 140b, and radial components by the directional arrows 141a or 141b. The tangential components cause the rotating member 107 to rotate on the nozzle bearing 106 until the line between the nozzle 94a and the center of the guide roller 108a is on the normal line 142 as shown by the guide roller 108 (solid circle) and outlet 94 (solid circle). When the line between the nozzle 94 and the center of the guide roller 108 coincides with normal line 142, the force on the roller is in the direction of arrow 147 and opposed by the restoring force as shown by the directional arrow 146. Therefore, there are no restoring components, and the funnel-guide assembly 101 is in a stable position. The restoring force continuously changes with the shape of the inside border 20a in contact with the guide roller 108, thereby continuously maintaining a uniform distance 137 between the nozzle 94 and the inside border 20a.

It is desirable that the radius of the nozzle bearing be in the range of ¼ inch to 1 inch. As the radius increases, the amount of force necessary to restore the guide roller 108 to the normal position increases. It is also desirable that the guide roller be in the range of ¼ inch to ½ inch in diameter. The preferred guide-roller diameter is 5/16 inch. With a 5/16-diameter guide roller 108, the roller rolls on the funnel surface without skidding.

Approaching the beginning of each of the corners 17a through 17d of the sealing surface 16, the outlet 74 is gradually moved from the first path to a second path displaced towards the outer border 20b, a second uniform distance from the inside border 20a. Surprisingly this second uniform distance approximately corrects for the rapid change in direction of flow of the sealing bead from the nozzle outlet 94 when the corner portions 17a through 17d rotate past the nozzle outlet 94. The rapid change in direction causes the bead of sealing material to deposit nearer the inside border 20a.

In each of the corners 17a through 17d, the rotating sealing surface is tracked with the outlet 94 along a second path a second uniform distance from the inner border 20a. The second uniform distance is obtained by displacing the nozzle bearing 106 off center with the nozzle outlet 94. Referring to FIGS. 5, 6, and 7, with the third pneumatic 115 in position shown (FIG. 5), the nozzle bearing 106 is concentric with the nozzle outlet 94. When the third pneumatic cylinder 115 is extended, the cam 112 is rotated, thereby pivoting the nozzle-bearing mounting member 103 about the pivot screw 104. This provides a second uniform distance between the center 144 of the guide roller 108 and the nozzle outlet 94 (between the inside border 20a and the nozzle outlet 94).

Referring to FIGS. 1 and 5, the third pneumatic cylinder 115 is operated by the actuator disc 55a. Actuators 56a are positioned on the periphery of the actuator disc 55a angularly related to the corner portions 17a through 17d of the funnel-sealing surface 16. The actuators 56a are positioned to operate a switch 57a. Operating the switch 57a actuates a solenoid valve (not shown) to extend the third pneumatic cylinder 115. Actuating the third pneumatic cylinder 115 slowly rotates the cam 112 to gradually increase the distance between the nozzle outlet 94 and the inside border 20a of the funnel-sealing surface 16. The third pneumatic cylinder 115 remains extended only when switch 57a is actuated. When the cam 112 is rotated to its standby position by retracting the third pneumatic cylinder 115, the distance between the inside border 20a and the nozzle outlet 94 is also gradually changed to the first distance. Approaching the ending of each of the corners 17a through 17d of the sealing surface, the outlet is gradually moved from the second larger path to the first path.

In applying the bead of sealing material to ultrarectangular funnels, the corner radius of the rectangular driven gear 34 which is formed for a rectangular color-picture-tube funnel is larger than the radius of corresponding corners 17a through 17d of the sealing surface 16 of ultrarectangular color-picture-tube funnels. Therefore, a speed change to a second uniform motor speed is also simultaneously made at the corners to attempt to achieve substantially the same or slower relative speed between the nozzle and the sealing surface at the sealing-surface corners 17a through 17d as on the sealing surface sides 18a, 18b, 19a and 19b. The slower relative speed at the sealing-surface corners 17a through 17d is in the range of ½ to ¾ the speed at the sealing surface sides 18a, 18b, 19a and 19b. Actuators 56b are positioned on the second actuator disc 57b as angularly related to the corners 17a through 17d of the funnel-sealing surface 16. These actuators 56b operate a motor-speed control 53 to change the speed of the variable speed motor 41 to the second uniform motor speed.

The funnel-guide assembly 101 may also be positioned to guide from the outside border 20b of the funnel-sealing surface. The guide assembly can guide from any border surface maintaining the nozzle outlet 94 a first or second uniform distance from the border surface.

Although only two uniform distances are described, there can be other similar uniform distances. Each uniform distance can be selected for any desired portion of the funnel-sealing surface by appropriate positioning of the actuators 56a as angularly related to the sealing surface. There also can be additional speeds controlled by the motor-speed control. The motor speed can be changed in any angular position related to the seal edge where different uniform relative speeds between the nozzle outlet 94 and the sealing surface 16 are desired. For example, a slower relative speed may be desirable, especially where the sealing surface is wider, to provide a greater rate of deposit of sealing material on the wider sealing surface.

In the description of the apparatus, the sealing-material container is supported on the end of a pivoted arm. The container may also be supported on a slide. The greater the arm length, the closer the arc of container movement approaches the straight line movement obtained from a slide. The slide would be positioned to operate in the direction of a corner radial line.

I claim:

1. A method for applying a bead of sealing material to the sealing surface of a cathode-ray tube, said surface having a closed configuration including radiused corners, an inner border and an outer border, said method including the steps of:
   (1) positioning said sealing surface in a substantially horizontal plane,
   (2) movably positioning in a substantially horizontal plane a container for said sealing material having a bottom outlet over said sealing surface,
   (3) rotating said sealing surface substantially in a horizontal plane about the axis of said funnel,
   (4) tracking said rotating sealing surface with said outlet along a first path, a first uniform distance from said inner border,
   (5) approaching the beginning of each of said corners of said sealing surface, gradually moving said outlet from said first path to a second path displaced toward said outer border, said second path being a second uniform distance from said inner border,
   (6) tracking said rotating sealing surface with said outlet on each of said corners along said second larger path,
   (7) approaching the ending of each of said corners of said sealing surface, gradually moving said outlet from said second path to said first path,
   (8) and during said rotating, dispensing a bead of sealing material from said container on said sealing surface.

2. The method of claim 1 wherein said dispensing is at a first rate on said sides of said sealing surface and at a greater rate on said corners of said sealing surface.

3. The method of claim 2, wherein said greater rate is in the range of 1¼ to 1½ that of said first rate.

References Cited
UNITED STATES PATENTS

| | | | |
|---|---|---|---|
| 3,492,146 | 1/1970 | Kornaker | 117—43 |
| 2,374,288 | 4/1945 | Hinkley et al. | 117—43 X |
| 2,959,493 | 11/1960 | Vincent | 117—94 X |
| 2,894,359 | 7/1959 | Pawlicki | 117—94 X |

RALPH S. KENDALL, Primary Examiner

K. P. GLYNN, Assistant Examiner

U.S. Cl. X.R.

117—94, 97; 118—319